F. G. WARD.
TREAD FOR PNEUMATIC TIRES.
APPLICATION FILED SEPT. 8, 1908.
954,232.
Patented Apr. 5, 1910.
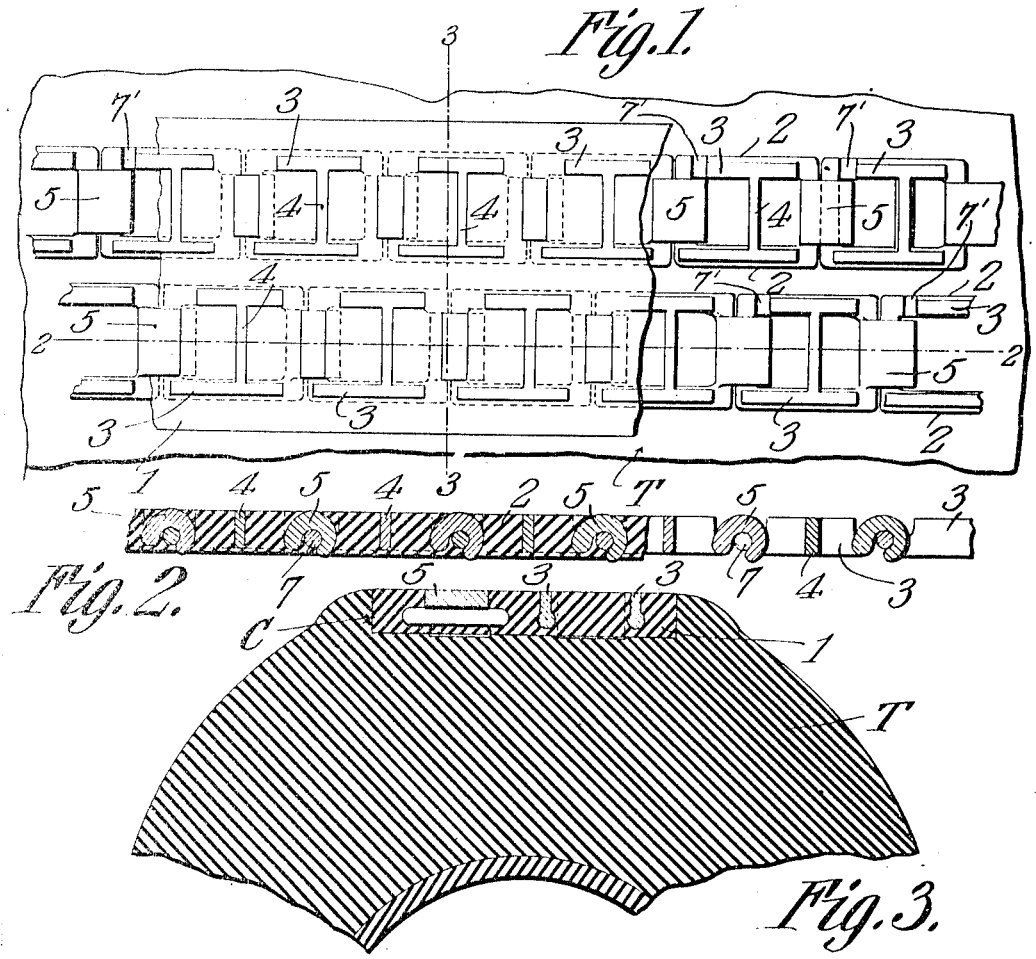
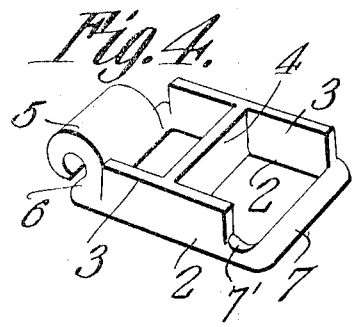
Witnesses:
Inventor,
Frederick G. Ward.
By C. A. Snow & Co.
Attorneys.

UNITED STATES PATENT OFFICE.

FREDERICK G. WARD, OF PITTSBURG, PENNSYLVANIA.

TREAD FOR PNEUMATIC TIRES.

954,232.  Specification of Letters Patent.  Patented Apr. 5, 1910.

Application filed September 8, 1908. Serial No. 452,002.

*To all whom it may concern:*

Be it known that I, FREDERICK G. WARD, a citizen of the United States, residing at Pittsburg, in the county of Allegheny and State of Pennsylvania, have invented a new and useful Tread for Pneumatic Tires, of which the following is a specification.

This invention relates generally to pneumatic tires, and particularly to a novel form of tread therefor, designed either to be formed integral with the tire, or to be connected thereto subsequent to the formation thereof.

The object of the invention is to provide a tread designed for use upon heavy automobile tires, the construction of which shall be such as positively to prevent skidding when the vehicle is rounding curves.

A further object of the invention is to provide a tread of the above character utilizing catenate non-skidding members, portions of which are exposed through the surface of the tread in such proximity as to secure, in a positive manner, the object sought.

With the above and other objects in view, as will appear as the nature of the invention is better understood, the same consists in the novel construction and combination of parts of a tread for automobile tires, as will be hereinafter fully described and claimed.

In the accompanying drawings forming a part of this specification, and in which like characters of reference indicate corresponding parts:—Figure 1 is a top plan view of a short section of a pneumatic tire showing the improved tread assembled therewith, a portion of the tread being broken away to display the non-skidding members. Fig. 2 is a longitudinal sectional view of the tread only taken on the line 2—2, Fig. 1. Fig. 3 is a transverse sectional view taken on the line 3—3, Fig. 1. Fig. 4 is a perspective detail view of one of the links of the non-skidding element, shown in Figs. 1, 2, and 3.

The pneumatic tire T, shown in section in Fig. 3, may be of the usual or any preferred construction and therefore requires no detailed description, further than to state that its tread portion is provided with a circumferential groove or channel C in which is seated the tread, designated generally 1, that constitutes the gist of the present invention.

The tread 1 is constructed of rubber, and has embedded in it, prior to being vulcanized, the chains that constitute the non-skidding members. As shown in Fig. 1, in which two of the chains are displayed, the links are constructed similar to those of an ordinary sprocket chain, except that the side bars 2 have formed integral with them ribs or fins 3, that may project any distance beyond the bars, and are connected and braced by a transverse rib or fin 4, that is integral with the side ribs. These fins are preferably of the same height as the knuckles 5 of the links, and the knuckles and non-skidding members 3 and 4 are designed to project slightly beyond the outer face of the tread, thus to take an effective hold upon the ground or pavement over which the automobile may be passing. The knuckle 5 is cast integral with one of the end bars 6, the other end bar 7 being arranged to be engaged with the knuckle of the preceding link in the usual manner. A notch 7' is formed in one side of each link and close to the bar 7, said notch being of such size as to permit the disconnection of the links by shifting therethrough the knuckle 5 engaging the bar 7 adjacent to which the notch is located. As usual, the chains will be embedded in the tread 1 and vulcanized therein, and will also be vulcanized or held in the channel C in a manner that will be thoroughly effective in preventing disconnection of the parts. As will be apparent, the end bars 7 will be protected from injury by the knuckles 5, and the side bars 2 will be shielded, by the knuckles, and longitudinal and transverse ribs. Preferably, the side bars will occupy a position about midway of the thickness of the tread, and this will impart an extended wear resisting quality to the device.

As will be apparent, owing to the linked relation of the non-skidding members, the smooth running qualities of the tire will not be diminished, and as the links will readily yield to pressure, the wear between the connected series of links will be materially reduced.

While it will generally be preferred to employ but two series of links or two lengths of chains with the tread, yet, as will be obvious, this number may be increased or diminished, if found necessary or desirable.

The improvements herein defined, while simple in character, will be found thoroughly effective for the purposes designed, and will result in the presentation of a durable and highly efficient form of non-skidding tread.

I claim:—

A tread for pneumatic tires comprising an endless band of flexible material and connected chain links embedded within said band, said links having connecting knuckles, there being parallel side ribs and an intermediate transverse rib upon every link, said side ribs being spaced from the side ribs on the adjoining links, there being a notch on one side of each link between one end of the link and one of the side ribs, all portions of the links with the exception of the outer faces of the knuckles and ribs being concealed within the band, the knuckle of each link being shiftable laterally through the notch in the adjoining link and out of engagement with said link.

In testimony that I claim the foregoing as my own, I have hereto affixed my signature in the presence of two witnesses.

FREDERICK G. WARD.

Witnesses:
HARRY W. FULTON,
JOHN A. YOUNG.